United States Patent
Dervin et al.

(10) Patent No.: US 7,130,897 B2
(45) Date of Patent: Oct. 31, 2006

(54) DYNAMIC CLUSTER VERSIONING FOR A GROUP

(75) Inventors: Jennifer Anne Dervin, Rochester, MN (US); Robert Miller, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 09/975,442

(22) Filed: Oct. 11, 2001

(65) Prior Publication Data

US 2003/0074426 A1    Apr. 17, 2003

(51) Int. Cl.
*G06F 15/167*    (2006.01)
*G06F 9/44*    (2006.01)

(52) U.S. Cl. .................... 709/221; 717/171
(58) Field of Classification Search ............... 717/176, 717/171, 168, 169, 170; 709/220–221
See application file for complete search history.

(56) References Cited

U.S. PATENT DOCUMENTS

| | | | |
|---|---|---|---|
| 5,732,275 A | 3/1998 | Kullick et al. ............ 395/712 |
| 5,974,429 A * | 10/1999 | Strub et al. ............... 707/203 |
| 6,003,075 A * | 12/1999 | Arendt et al. ............. 709/221 |
| 6,070,012 A * | 5/2000 | Eitner et al. .............. 717/168 |
| 6,163,855 A * | 12/2000 | Shrivastava et al. ........ 714/4 |
| 6,438,705 B1 * | 8/2002 | Chao et al. ................ 714/4 |
| 6,453,468 B1 * | 9/2002 | D'Souza ................... 717/168 |
| 6,505,257 B1 * | 1/2003 | Murata et al. ............. 710/8 |
| 6,618,805 B1 * | 9/2003 | Kampe ..................... 713/1 |
| 6,769,008 B1 * | 7/2004 | Kumar et al. ............. 709/201 |
| 2001/0056461 A1 * | 12/2001 | Kampe et al. ............. 709/201 |
| 2003/0005200 A1 * | 1/2003 | Kumar et al. ............. 710/302 |

OTHER PUBLICATIONS

U.S. Appl. No. 09/694,586, entitled "Dynamic Modification of Cluster Communication Parameters in Clustered Computer System", filed Oct. 23, 2000, by Timothy Roy Block et al, (ROC920000192US1).

* cited by examiner

*Primary Examiner*—Andrew Caldwell
(74) *Attorney, Agent, or Firm*—Wood, Herron & Evans, LLP

(57) ABSTRACT

An apparatus, program product, and method update the cluster infrastructure version used by a group resident in a clustered computer system without requiring a shut down of the group during the update. The cluster infrastructure software in individual nodes in the clustered computer system is updated while the group is maintained in an active state. After the cluster infrastructure software is updated, the group is then notified of the update. In response to the notification, the cluster infrastructure version used by the group is dynamically updated to that of the updated cluster infrastructure software, thus making additional functions supported by the new version of the cluster infrastructure software available for use by all group members.

31 Claims, 3 Drawing Sheets

DYNAMIC CLUSTER VERSIONING FOR A GROUP

FIELD OF THE INVENTION

The invention is generally directed to clustered computer systems, and in particular, to updating of the cluster infrastructure software in such systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group. One type of protocol, for example, is a membership change protocol, which is used to update the membership of a particular group of member jobs, e.g., when a member job needs to be added to or removed from a group.

Conventional clustered computer systems also typically rely on some form of cluster infrastructure software that is resident on each node in the cluster, and that provides various support services that group members utilize in connection with performing tasks. Cluster infrastructure software is roughly analogous to an operating system on a non-clustered computer system. Whereas an operating system manages the execution of software applications and provides a programming interface through which applications can invoke various support functions (e.g., to interact with attached I/O devices, to display certain information to a user, etc.), cluster infrastructure software manages the execution of group members and provides a programming interface through which jobs can invoke various cluster-related support functions (e.g., to pass messages between group members, to change group membership, etc.).

Cluster infrastructure software, like all software, may be upgraded from time to time. Thus, as with much software, each release of cluster infrastructure software is typically associated with a "version" that distinguishes that release from prior releases of the software. Upgrades to cluster infrastructure software may be desirable, for example, to provide "bug fixes" that correct errors found in previous versions of the software. However, in some instances, upgrades to cluster infrastructure software may be desirable to add new support services to the software, e.g., to add new functions and capabilities.

Whenever an operating system is upgraded on a computer, and that operating system provides a new function, it is often possible for any software applications that are resident on that computer to recognize the new version of the operating system, and as a result, take advantage of the new function. In some instances, such applications may themselves need to be upgraded as well, although in other instances, such applications may have been initially developed to work with a later version of an operating system, yet made capable of working with earlier versions as well. For this reason, many software applications are capable of detecting the version of the operating system of a computer upon which they are installed, and adapt their functionality accordingly.

Likewise, in a clustered computer system, group members are typically capable of detecting the version of cluster infrastructure software on the nodes upon which such group members reside. However, it is important to note that, since cluster infrastructure software must be resident on each node of a cluster, the version of the cluster infrastructure software on each node may differ from node to node. To accommodate for any differences in functionality, many clustered computer systems require that when a group is formed in a clustered computer system, the members select as the current "cluster version" used by the group, the lowest version of the cluster infrastructure software that is installed in the system. Moreover, once the group is created, the cluster version used by the group is set, and cannot thereafter be changed without restarting the group. In addition, whenever any new member joins the group, the member will be informed of the current cluster version, and thus select the same cluster version as that used by the other members of the group.

Thus, for example, if a clustered computer system has three nodes where the cluster infrastructure software is version 2.0, and one node where the cluster infrastructure software is version 1.0, the cluster version used by a newly created group will be version 1.0. Likewise, a new member added to the group will be informed that the cluster version used by that group is version 1.0, regardless of the cluster version capable of being used by the new member.

The process of upgrading the operating system used in a computer is relatively straightforward and well known. Prior to upgrading an operating system, typically all applications running on a computer are shutdown. A new version of the operating system is then installed and the computer is restarted. Applications thereafter are restarted. When these applications are restarted, they may detect the new version of the operating system, and thereafter utilize any new functions made available by the new version.

Conventional clustered computer systems handle cluster infrastructure software upgrades in a similar manner, and require that all groups end and then restart under the new cluster infrastructure version. However, ending groups for the purpose of upgrading the cluster infrastructure software is inconsistent with a primary goal of a clustered computer system—that of maintaining constant availability. Despite the fact that individual nodes may leave or join a cluster at any given time, and that the group members residing thereon may leave or join their respective groups while a cluster remains active, until a group is shut down and restarted, the cluster version used by that group cannot be changed.

Given the overriding desire to maximize system availability in a clustered computer system, there is a significant need to eliminate as many instances as possible where groups need to be shut down. Therefore, a significant need exists in the art for a manner of upgrading the version of cluster infrastructure software used by a group in a clustered computer system without having to shut down the group.

SUMMARY OF THE INVENTION

The invention addresses these and other problems associated with the prior art by providing an apparatus, clustered computer system, program product, and method for updating the cluster infrastructure version used by a group resident in a clustered computer system without having to shut down the group. Thus, system availability is improved over conventional clustered computer systems where groups are otherwise required to be shut down and restarted to take advantage of updates to cluster infrastructure software.

In embodiments consistent with the invention, the cluster infrastructure software in individual nodes in a clustered computer system is updated while a group, resident on the clustered computer system, is maintained in an active state. After the cluster infrastructure software is updated, the group is then notified of the update. In response to the notification, the cluster infrastructure version used by the group is dynamically updated to that of the updated cluster infrastructure software, thus making additional functions supported by the new version of the cluster infrastructure software available for use by all group members.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
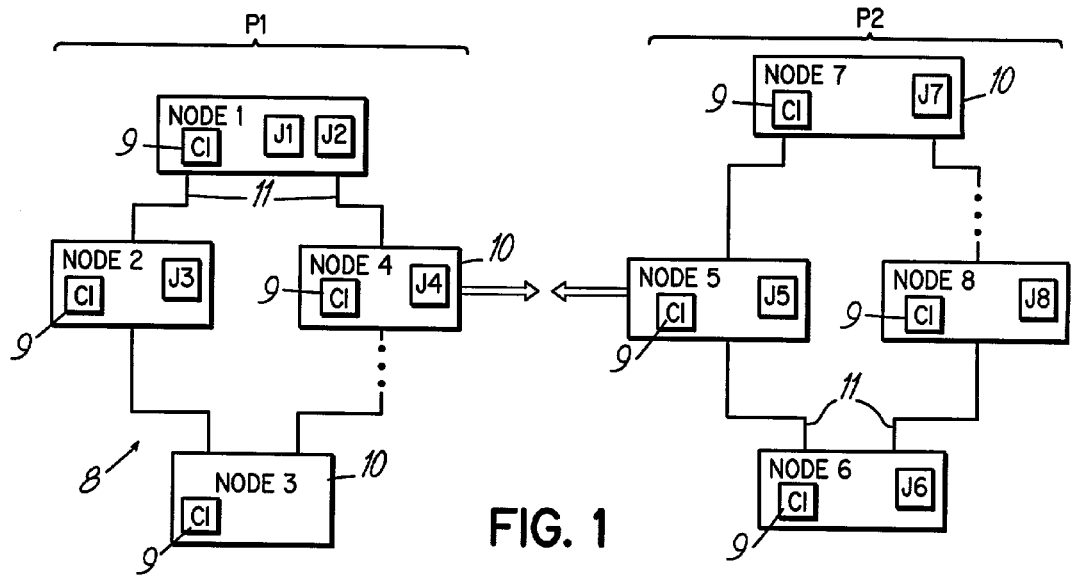
FIG. 1 is a block diagram of a clustered computer system consistent with the invention, illustrating an exemplary cluster version update operation performed thereon.

Turning now to the Drawings, wherein like numbers denote like parts throughout several views, FIG. 1 illustrates an exemplary clustered computer system 8 including a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another using ordered messaging calling functions available in cluster infrastructure (CI) software 9. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3, . . . 8. Resident within various nodes are a plurality of jobs J1–J8 forming the members of an exemplary group J in the clustered computer system. As shown in this figure, nodes in a clustered computer system are not required to participate in all groups (e.g., node 3). Moreover, multiple jobs from a given group may be resident in the same node (e.g., jobs J1 and J2 in node 1).

Member jobs communicate with one another through the use of ordered messages. A portion of such messages are referred to herein as "requests," which are used to initiate "protocols" in response to activation by a user (e.g., an application or other computer process executing on one or more nodes in the clustered computer system). A protocol is a unit of work that all members of a group are required to handle. Typically, in response to a protocol request, each member is also required to return an acknowledgment message to indicate success or failure of a particular protocol by that member. Moreover, typically no member is permitted to continue until acknowledgment messages have been received from all group members, and if a member failure occurs, the failure is translated into an acknowledgment message to prevent the protocol from hanging.

Further, membership in a group need not be static, and many clustered computer systems support the ability to add or remove members to or from a group (often referred to as member "join" and "leave" operations). Typically, a change in membership of a group is handled via a particular protocol referred to as a membership change protocol, and is handled through the use of a membership change request message forwarded to all members of a group.

For these changes in membership, the CI software 9, resident as part of establishing a node, is used. The CI software 9 contains a library of functions or "features" available for use by group members. In one embodiment, a cluster control group is established to initiate membership change protocols with the CI software 9 to change group membership.

When a group is established, all group members are informed of the version (e.g., version 1.0) of CI software 9 the group will operate under. Also, when a new member joins a group, a membership change protocol uses a membership change message to inform the new group member of the version (e.g., version 1.0) of CI software 9 the group is operating under. However, the use of the existing membership change protocols do not facilitate updating the version (e.g., version 1.0 to 2.0) of CI software 9 once a group is established. Rather, the only mechanisms available for updating the version of the cluster infrastructure software used by a group require that a group end and later restart under the new version of the cluster infrastructure software.

From time to time, the ability of group members to communicate with one another may be lost. When this occurs, some clustering environments will partition a group into two or more partitions, or independent instances of the same group. FIG. 1 shows an example of such a communication loss between nodes 4 and 5, creating two partitions, P1 and P2.

To re-establish communication between members of a group and eliminate the partitioning, other functions available in the CI software 9 are called. In another embodiment, a cluster control group initiates a merge protocol to eliminate the partition. The use of this, or a similar, function prior to updating the cluster infrastructure software prevents migrating a portion of the group members to a new version of cluster infrastructure while stranding another portion of the group members in a earlier version, never to be recovered.

It will be appreciated that nomenclature other than that specifically used herein to describe the handling of computer tasks by a clustered computer system using cluster infrastructure software may be used in other environments. Therefore, the invention should not be limited to the particular nomenclature used herein, e.g., as to protocols, requests, messages, jobs, merges, partitions, joins, etc.

Figure 2:
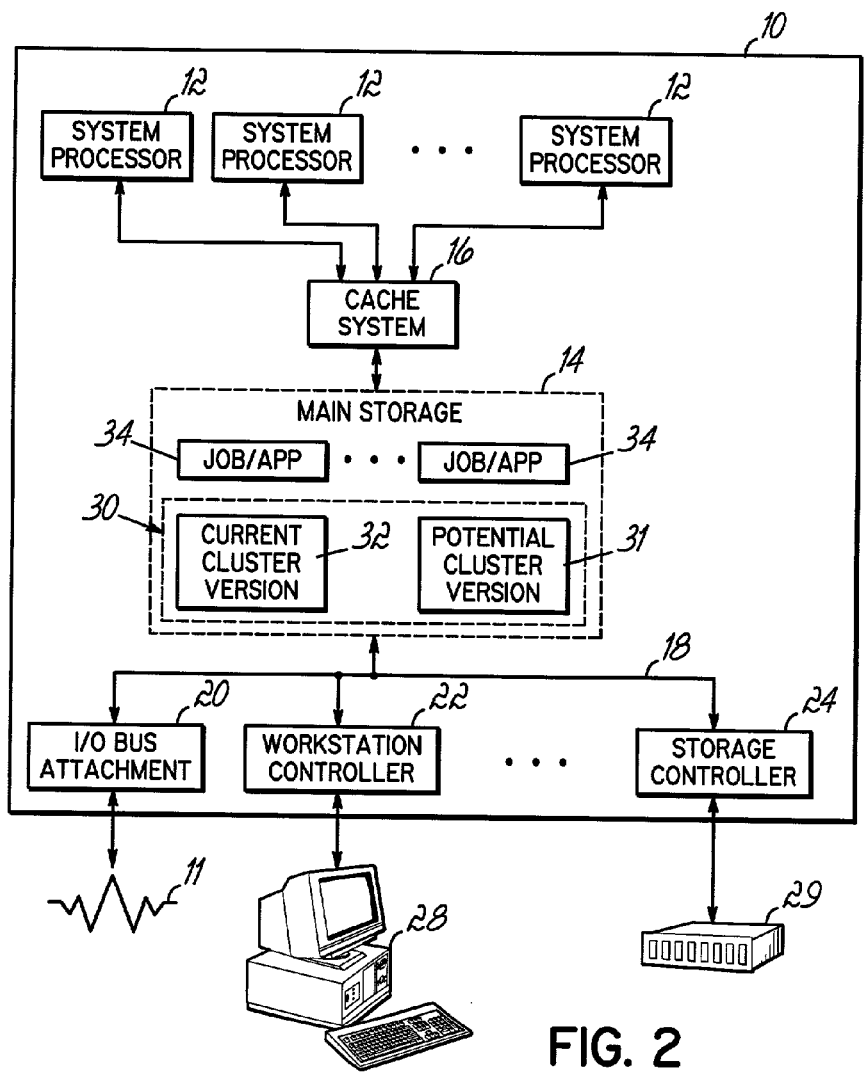
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 29. One or more jobs or applications 34 are also illustrated in node 10, each having access to features implemented within the cluster infrastructure software 30. Any number of alternate computer architectures may be used in the alternative.

In yet another embodiment, each node 10 is implemented as an AS/400 or iSeries eServer from International Business Machines Corporation, and Operating System 30 is implemented as an OS/400-compatible operating system incorporating clustering capabilities. The general use and configuration of clustering services in the exemplary environment is described, for example, in U.S. patent application Ser. No. 09/694,586, filed on Oct. 23, 2000 by Timothy Roy Block et al., entitled "DYNAMIC MODIFICATION OF CLUSTER COMMUNICATION PARAMETERS IN CLUSTERED COMPUTER SYSTEM", the disclosure of which is incorporated by reference herein.

To implement dynamic cluster versioning for a group consistent with the invention, message processing functionality may be implemented within cluster infrastructure software in each node to change the version of the cluster infrastructure used. To assist in this endeavor, a job or application 34 referred to as a CCTL group member makes calls to a cluster engine or CLUE within the cluster infrastructure software 30. It will be appreciated that the CCTL group member, or a like entity that might be utilized in other clustering environments, may not be used in other implementations.

In addition, in the illustrated implementation, each node 10 typically maintains a record of current and potential versions. The current cluster version refers to that version of the cluster infrastructure software that is currently running on the node. The potential cluster version, on the other hand, relates to the version of the cluster infrastructure software that the node 10 is capable of running, e.g., subsequent to installation of a new version on a node. Thus, in a dynamic cluster version update, node 10 will switch from operating under a current cluster version (represented at block 32) to a potential cluster version (represented at block 31) while maintaining availability during this process.

In the illustrated embodiment, typically the potential cluster version is a later or more recent cluster version than the current cluster version. However, this need not necessarily be the case. The apparatus, program product, and method provided herein allows migration from any cluster infrastructure software version to any other cluster infrastructure software version provided it is appreciated that the availability of various "features" or functions contained within certain cluster infrastructure software versions may not be backward compatible in some instances.

Furthermore, it will be appreciated that updating the cluster infrastructure software may incorporate only updating a portion of the cluster infrastructure used by the group and the present invention should not be read to limit in any way the extent to which cluster infrastructure is modified.

It will also be appreciated that other groups which provide similar functionality to those groups described herein may be used without departing from the spirit of the invention. In addition, the functionality or features described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to implement the above-described dynamic cluster versioning for a group functionality. The routines executed to implement the embodiments of the invention, whether implemented as part of an operating system or a specific application, component, program, object, module or sequence of instructions, will also be referred to herein as "computer program code," or simply "program code." Computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
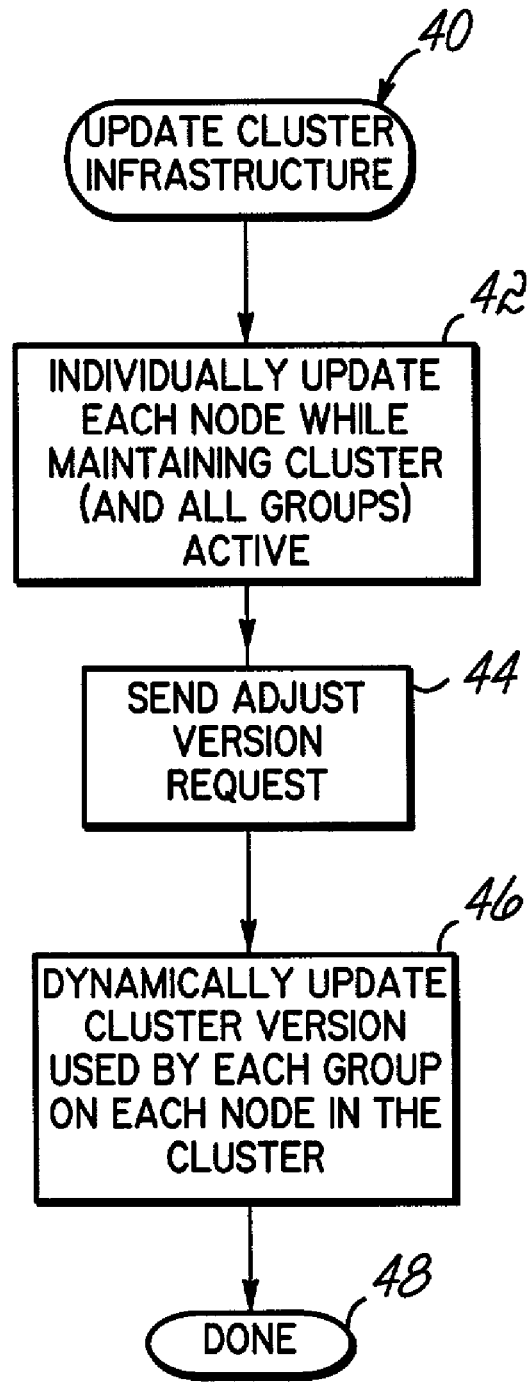
FIG. 3 is a flow chart illustrating a sequence of operations for dynamically updating cluster infrastructure software in the clustered computer system of FIGS. 1 and 2.

Turning now to FIG. 3, a flow chart illustrates at 40 a sequence of operations for dynamically updating the cluster infrastructure software in a clustered computer system. As shown in block 42, the cluster infrastructure software resident on each node in the cluster is individually updated while maintaining the cluster, and all groups thereon, active. The process of updating individual nodes uses existing node leave and restart functionality, as well as software update functionality. Once the cluster infrastructure software on all nodes has been updated, an adjust version request is sent to any node in the group, as shown in block 44. Then, in block 46, the cluster infrastructure software version used by each group on each node in the cluster is dynamically updated. The routine concludes in block 48.

Figure 4:
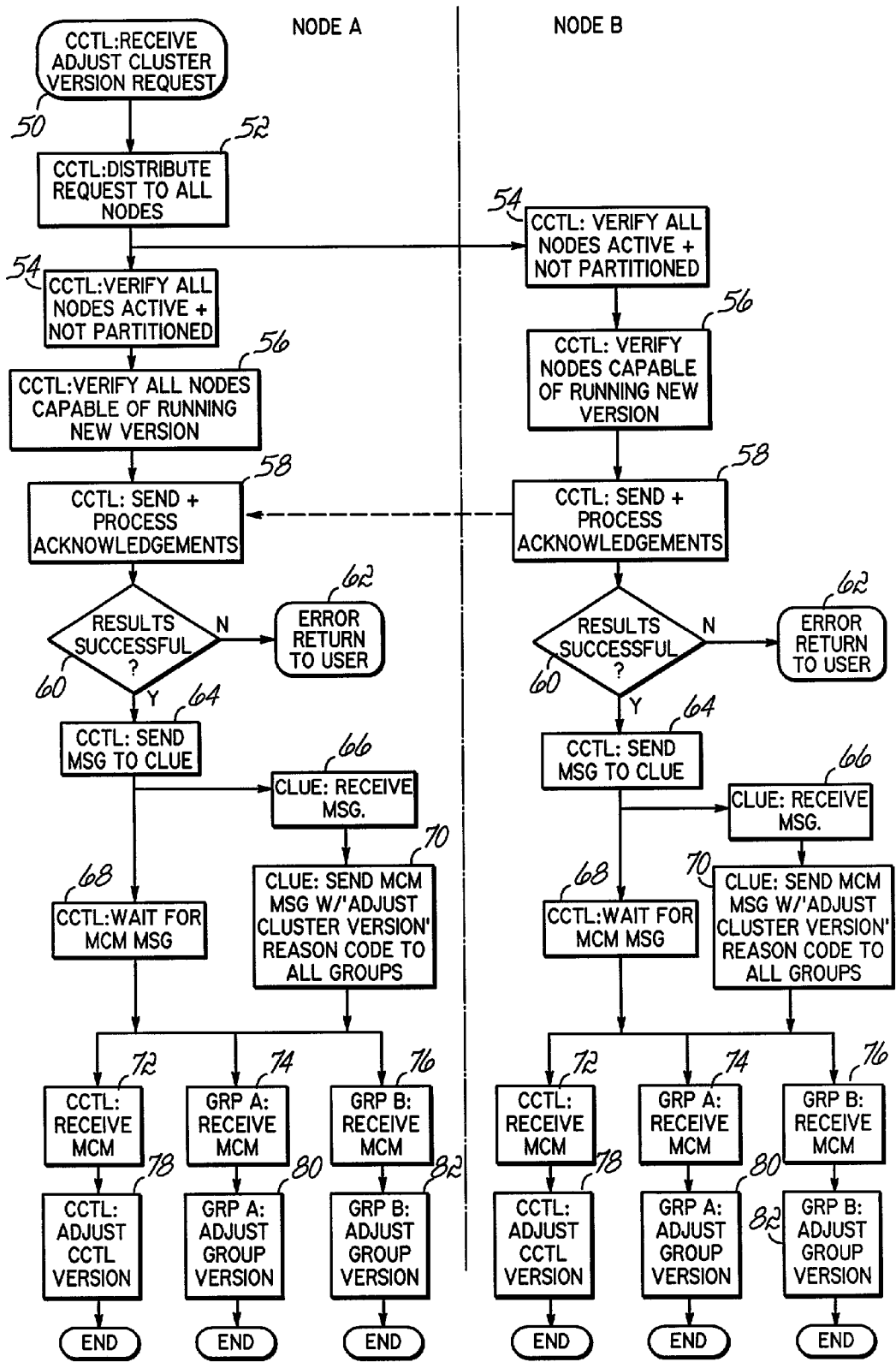
FIG. 4 is a flow chart illustrating the program flow of a cluster version update routine executed in the exemplary clustered computer system of FIGS. 1 and 2 when dynamically updating the cluster version in the sequence of operations of FIG. 3.

Turning now to FIG. 4, an exemplary cluster version update protocol handling routine 50 that is executed in response to the request issued in block 44, and that implements block 46, of FIG. 3, is illustrated. For ease of explanation, a two node cluster (e.g., node A and node B) hosting three groups (e.g., a CCTL group, group A, and group B) is illustrated. However, it will be appreciated that addition nodes with additional members or additional groups could be added without departing from the spirit of the invention.

As discussed above, routine 50 begins, for example, when the CCTL group member resident on node A receives an adjust cluster version request from a user. In this particular embodiment, every node in the clustered computer system has resident a member of the CCTL group. Most, if not all, clustered computer systems have resident such a group; although, such a group may be known by other names in various other systems. It will be appreciated that the use of these other names does not depart from the spirit of the present invention.

Upon receipt of the request to adjust the cluster version, the CCTL group member resident on node A distributes the request to the other CCTL group members resident on all other nodes as shown in block 52, using an ordered message. The CCTL group members resident on each respective node then verify that all nodes are active and are not partitioned, as shown in block 54. An example of a partitioned group is shown above in conjunction with FIG. 1. The purpose of verifying whether the nodes are active is to ensure inclusion of all nodes in the cluster version update. Again, the purpose of verifying whether a group is partitioned is to prevent migration of a portion of the group members to a new version of cluster infrastructure software and stranding another portion of the members in a earlier version, never to be recovered. In other embodiments, verification of whether all nodes are active and/or whether the nodes are not partitioned may not be performed.

Once the CCTL group members resident on each node have verified that all nodes are active and not partitioned, control is passed to block 56. In block 56, the CCTL group members verify that each node is capable of running the new version of the cluster infrastructure software. In other words, the CCTL software reports whether the new version of the cluster infrastructure code has been installed on each node. Control is then passed to block 58 wherein each node sends an ordered message acknowledging whether or not the new code has been installed and whether or not all nodes are active and not partitioned. Control is then passed to block 60.

As shown in block 60, the CCTL group member resident on each node determines whether the results of the previous inquires were successful. If the nodes are inactive or partitioned or the new cluster infrastructure code has not been installed in all nodes, another ordered message acknowledging an error has occurred is returned to the user in block 62. On the other hand, if the nodes are active and are not partitioned and the new cluster infrastructure code has been installed in all nodes, control is passed to block 64.

In block 64, the CCTL group member resident on each node sends a message to the cluster engine (CLUE) in the cluster infrastructure software to change the cluster version. In block 66, CLUE receives the message while the CCTL group member waits for a membership change message (MCM) from CLUE in block 68. In block 70, CLUE sends an MCM with "Adjust Cluster Version" reason code to each group resident on each respective node. In blocks 72, 74, and 76, the CCTL group, group A, and group B members, respectively, receive the MCM for their respective groups with the "Adjust Cluster Version" reason code. In blocks 78, 80, and 82, the CCTL group, group A, and group B members, respectively, examine the reason code, and determine that a user has made a request to adjust the cluster version from the current cluster version 32 to the potential cluster version 31 as shown in FIG. 2. Each group then updates its cluster version to the potential cluster version. Thus, the user request which brought about the MCM with the "Adjust Cluster Version" reason code dynamically updates the cluster version for all groups.

It will be appreciated that the version update process is accomplished while maintaining the CCTL group, group A, and group B active. It will be further appreciated that the use of ordered messaging ensures that all members within a particular group will update at approximately the same time from a group perspective since no other group operations will be permitted in the interim.

It will also be appreciated that all groups need not be updated simultaneously. Rather, in some embodiments, individual groups maybe updated as desired by users.

One benefit of the present invention is that a group may take advantage of a change in cluster version without the group having to end. This allows for correction of errors or fixing "bugs," in the previous version of the cluster infrastructure software and adding new functionality, including the ability to access additional functions made available in the new version of the cluster infrastructure software without any significant disruption in group accessibility. In embodiments consistent with the present invention, a new cluster version may be "rolled-out" among members of the cluster, one node at a time (e.g., one node is taken down, a new cluster version installed, and the node brought back into the cluster). Moreover, by using existing member management functionality in a clustered computer system, members are automatically removed from and returned to a group whenever a node is taken down and brought back into the cluster, yet the group remains in an active state throughout. Once all of the nodes have been updated, the Adjust Cluster Version command can be applied to dynamically update all of the nodes. It will be further appreciated that although the individual nodes have gone down during this process, the cluster and groups in the cluster as a whole have not, thus the availability of the system is maintained throughout.

Also, it should be appreciated that, in connection with updating the cluster infrastructure software on the node, individual group members may be updated as well, e.g., to take advantage of new functionality in the new cluster infrastructure software version. As an example, a group member resident on a node may be updated before, during or after updating the cluster infrastructure software on that node, and while that node is still shutdown due to the cluster infrastructure software update. In such an instance, the adjust version operation used for the cluster infrastructure software may also update the group version used by the group, once it is verified that all group members have been updated. In other embodiments, a group may be updated separately from the cluster infrastructure software; however, in some instances this may necessitate shutting down the group while the group members are being updated.

Those skilled in the art will recognize that the exemplary environments illustrated in FIGS. 1, 2, 3 and 4 are not intended to limit the present invention. Indeed, those skilled in the art will recognize that other alternative hardware and/or software environments may be used without departing from the scope of the invention. Therefore, the invention lies in the claims hereinafter appended.

What is claimed is:

1. A method of updating a cluster infrastructure version used by a group resident in a clustered computer system of the type including a plurality of nodes, the method comprising:
   (A) updating the cluster infrastructure software from a first version to a second version in individual nodes in the clustered computer system while the group is maintained in an active state, wherein the second version of the cluster infrastructure software has different program code from the first version of the cluster infrastructure software;
   (B) after the cluster infrastructure software is updated, notifying the group of the update to the cluster infrastructure software; and,
   (C) in response to the notification, dynamically updating a cluster infrastructure version used by the group to that of the updated cluster infrastructure software.

2. The method of claim 1, wherein the updated cluster infrastructure software includes at least one new function, whereby the group has access to the new function subsequent to dynamically updating the cluster infrastructure version used by the group.

3. The method of claim 1, further comprising notifying all groups resident in the clustered computer system after the cluster infrastructure software is updated.

4. The method of claim 1, wherein updating the cluster infrastructure software in an individual node comprises shutting down the node, installing cluster infrastructure software on the node, and restarting the node.

5. The method of claim 4, wherein shutting down the node includes removing a member that is resident on the node from the group and wherein restarting the node includes adding the member to the group.

6. The method of claim 1, wherein notifying comprises sending a ordered message to the group.

7. The method of claim 6, wherein notifying comprises sending a membership change message with an adjust version reason code.

8. The method of claim 1, further comprising verifying that all nodes are active prior to notifying the group.

9. The method of claim 1, further comprising verifying that the group is not partitioned prior to notifying the group.

10. The method of claim 1, further comprising verifying that all nodes are capable of running the updated cluster infrastructure version prior to notifying the group.

11. An apparatus comprising:
    (A) a node configured to participate in a clustered computer system, the node having resident thereon cluster infrastructure software and at least one member of a group; and,
    (B) program code resident in the node, the program code configured to notify the member of an update to the cluster infrastructure software on all nodes in the clustered computer system having a member of the group from a first version to a second version, and to dynamically update a cluster infrastructure version used by the member to that of the updated cluster infrastructure software; wherein the second version of the cluster infrastructure software has different program code from the first version of the cluster infrastructure software.

12. The apparatus of claim 11, wherein the updated cluster infrastructure software includes at least one new function, whereby the group has access to the new function subsequent to dynamically updating the cluster infrastructure version used by the node.

13. The apparatus of claim 11, wherein the notification is made using ordered messaging.

14. The apparatus of claim 13, wherein the notification is made via a membership change message with an adjust version reason code.

15. The apparatus of claim 11, wherein the program code is further configured to verify that the node is active prior to notifying the member and, if the node is not active, to return an error message.

16. The apparatus of claim 11, wherein the program code is further configured to verify that the group is not partitioned prior to notifying the member and, if the group is partitioned, to return an error message.

17. The apparatus of claim 11, wherein the program code is further configured to determine whether the node is capable of running the updated cluster infrastructure software prior to notifying the member and, if the node is not capable of running the updated cluster infrastructure software, to return an error message.

18. A program product, comprising:
    (A) program code configured to reside on a node that participates in a clustered computer system and that further has resident thereon cluster infrastructure software and at least one member of a group, the program code configured to notify the member of an update to the cluster infrastructure software on all nodes in the clustered computer system having a member of the group from a first version to a second version, and to dynamically update a cluster infrastructure version used by the member to that of the updated cluster infrastructure software; and, (B) a recordable type signal-bearing medium bearing the program code;

wherein the second version of the cluster infrastructure software has different program code from the first version of the cluster infrastructure software.

19. The program product of claim 18, wherein the updated cluster infrastructure software includes at least one new function, whereby the group has access to the new function subsequent to dynamically updating the cluster infrastructure version used by the node.

20. The program product of claim 18, wherein the notification is made using ordered messaging.

21. The program product of claim 20, wherein the notification is made via a membership change message with an adjust version reason code.

22. The program product of claim 18, wherein the program code is further configured to verify that the node is active prior to notifying the member and, if the node is not active, to return an error message.

23. The program product of claim 18, wherein the program code is further configured to verify that the group is not partitioned prior to notifying the member and, if the group is partitioned, to return an error message.

24. The program product of claim 18, wherein the program code is further configured to determine whether the node is capable of running the updated cluster infrastructure software prior to notifying the member and, if the node is not capable of running the updated cluster infrastructure software, to return an error message.

25. A cluster computer system, comprising:
(A) a plurality of nodes, each having resident thereon cluster infrastructure software;
(B) a group including a plurality of group members resident on the plurality of individual nodes; and, (C) program code resident on the plurality of nodes, the program code configured to shutdown and restart individual nodes among the plurality of nodes while maintaining the group in an active state so that the cluster infrastructure software resident on such individual nodes can be updated to incorporate different program code while such individual nodes are shutdown, the program code further configured to notify the group of the update to the cluster infrastructure software after the cluster infrastructure software has been updated in each of the plurality of nodes, and to dynamically update a cluster infrastructure version used by the group to that of the updated cluster infrastructure software.

26. The clustered computer system of claim 25, wherein the updated cluster infrastructure software includes at least one new function, whereby the group has access to the new function subsequent to dynamically updating the cluster infrastructure version used by the node.

27. The clustered computer system of claim 25, wherein the notification is made using ordered messaging.

28. The clustered computer system of claim 27, wherein the notification is made via a membership change message with an adjust version reason code.

29. The clustered computer system of claim 25, wherein the program code is further configured to verify that the node is active prior to notifying the member and, if the node is not active, to return an error message.

30. The clustered computer system of claim 25, wherein the program code is further configured to verify that the group is not partitioned prior to notifying the member and, if the group is partitioned, to return an error message.

31. The clustered computer system of claim 25, wherein the program code is further configured to determine whether the node is capable of running the updated cluster infrastructure software prior to notifying the member and, if the node is not capable of running the updated cluster infrastructure software, to return an error message.

* * * * *